(12) United States Patent
Martinez Carrasco et al.

(10) Patent No.: US 9,232,782 B2
(45) Date of Patent: Jan. 12, 2016

(54) DEVICE FOR DETERRING BIRDS FROM LANDING

(71) Applicant: SEMPRE ABRIL, S.L., Barcelona (ES)

(72) Inventors: Angel Martinez Carrasco, Barcelona (ES); Claudio Calveras Fugarolas, Barcelona (ES)

(73) Assignee: SEMPRE ABRIL, S.L., Barcelona (ES)

( * ) Notice: Subject to any disclaimer, the term of this patent is extended or adjusted under 35 U.S.C. 154(b) by 0 days.

(21) Appl. No.: 14/441,457

(22) PCT Filed: Oct. 21, 2013

(86) PCT No.: PCT/ES2013/070731
§ 371 (c)(1),
(2) Date: May 7, 2015

(87) PCT Pub. No.: WO2014/072550
PCT Pub. Date: May 15, 2014

(65) Prior Publication Data
US 2015/0282473 A1 Oct. 8, 2015

(30) Foreign Application Priority Data
Nov. 9, 2012 (ES) .................................. 201231716

(51) Int. Cl.
*E04B 1/72* (2006.01)
*A01M 29/32* (2011.01)
*A01M 29/06* (2011.01)

(52) U.S. Cl.
CPC ............... *A01M 29/32* (2013.01); *A01M 29/06* (2013.01); *E04B 1/72* (2013.01)

(58) Field of Classification Search
CPC ..... A01M 29/06; A01M 29/30; A01M 29/32; E04B 1/72; E04D 13/004
See application file for complete search history.

(56) References Cited

U.S. PATENT DOCUMENTS

| 333,611 | A | * | 1/1886 | Daveggio | A01M 29/06 116/143 |
| 697,072 | A | * | 4/1902 | Davis | A01M 29/06 116/22 A |
| 733,778 | A | * | 7/1903 | Weber | A01M 29/06 116/143 |
| 2,575,252 | A | * | 11/1951 | Berger | A01M 29/06 40/417 |
| 3,292,319 | A | | 12/1966 | McCarthy | |
| 4,074,653 | A | * | 2/1978 | Pember | A01M 29/06 116/22 A |
| D328,806 | S | * | 8/1992 | Tucker | D30/119 |
| 5,148,621 | A | * | 9/1992 | Rosen | A01M 29/16 43/1 |

(Continued)

FOREIGN PATENT DOCUMENTS

| CN | 201523200 U | 7/2010 |
| WO | 2010135771 | 12/2010 |

*Primary Examiner* — Christine T Cajilig
*Assistant Examiner* — Gisele Ford
(74) *Attorney, Agent, or Firm* — Sturm & Fix LLP

(57) ABSTRACT

The invention relates to a device for deterring birds from landing in a defined area, for example on maritime vessels, without causing physical damage, said device comprising a vertically positionable rotary actuating shaft whereon a retractably connected pair of rods (3) is arranged at the top by means of a hinged joint, such that said two rods (3) are able to extend horizontally and perpendicularly in relation to the actuating shaft and opposite each other, said actuating shaft (2) being mounted on a support (4) provided with hinge means in the lower part, that can angularly fold down said support (4) in relation to a base body (5). The lower part of said actuating shaft (2) is in contact with a spherical region arranged inside said support (4).

15 Claims, 4 Drawing Sheets

(56) References Cited

U.S. PATENT DOCUMENTS

| | | | | |
|---|---|---|---|---|
| 5,241,777 A * | 9/1993 | Looker | A01M 29/16 | 116/22 A |
| 5,343,651 A * | 9/1994 | Chatten | A01M 29/32 | 43/1 |
| 5,353,543 A * | 10/1994 | Teraoka | A01M 29/26 | 116/22 A |
| 5,452,536 A * | 9/1995 | Chatten | A01M 29/32 | 43/1 |
| 5,956,880 A * | 9/1999 | Sugimoto | A01M 29/06 | 116/22 A |
| 5,966,075 A * | 10/1999 | Blanks | A01M 29/06 | 119/712 |
| 5,974,998 A * | 11/1999 | Gregg, III | B63B 15/0083 | 114/90 |
| 6,264,173 B1 * | 7/2001 | Badger | G08B 13/122 | 256/10 |
| 6,282,833 B1 * | 9/2001 | Dashefsky | A01M 29/06 | 43/125 |
| 6,351,908 B1 * | 3/2002 | Thomas | A01M 29/06 | 116/22 A |
| 6,557,482 B1 * | 5/2003 | Doty, III | A01M 29/06 | 116/150 |
| 6,640,506 B2 * | 11/2003 | Landers | A01M 29/06 | 43/1 |
| 6,907,688 B2 * | 6/2005 | Brint | A01M 31/06 | 40/417 |
| 6,941,886 B1 * | 9/2005 | Suelzer | B63B 17/00 | 114/343 |
| 7,036,278 B1 * | 5/2006 | Donoho | A01M 29/32 | 43/1 |
| 7,536,823 B2 * | 5/2009 | Brint | A01M 31/06 | 40/417 |
| 7,549,248 B1 * | 6/2009 | Luster | A01M 31/06 | 40/412 |
| 7,788,840 B2 * | 9/2010 | Wyant | A01M 31/06 | 43/2 |
| 8,096,176 B1 * | 1/2012 | Mayers | A01M 29/32 | 73/170.01 |
| 8,869,732 B1 * | 10/2014 | Chervick | A01M 29/08 | 116/22 A |
| 8,915,026 B2 * | 12/2014 | Myers | A01M 29/30 | 119/712 |
| 8,931,436 B2 * | 1/2015 | Betzen | A01K 15/029 | 119/712 |
| 9,010,013 B2 * | 4/2015 | Smith | A01M 31/06 | 43/2 |
| 2004/0181991 A1 * | 9/2004 | Rains | A01M 29/32 | 43/1 |
| 2007/0074467 A1 | 4/2007 | Zecher | | |
| 2010/0236470 A1 * | 9/2010 | Doty, III | A01M 29/06 | 116/22 A |

* cited by examiner

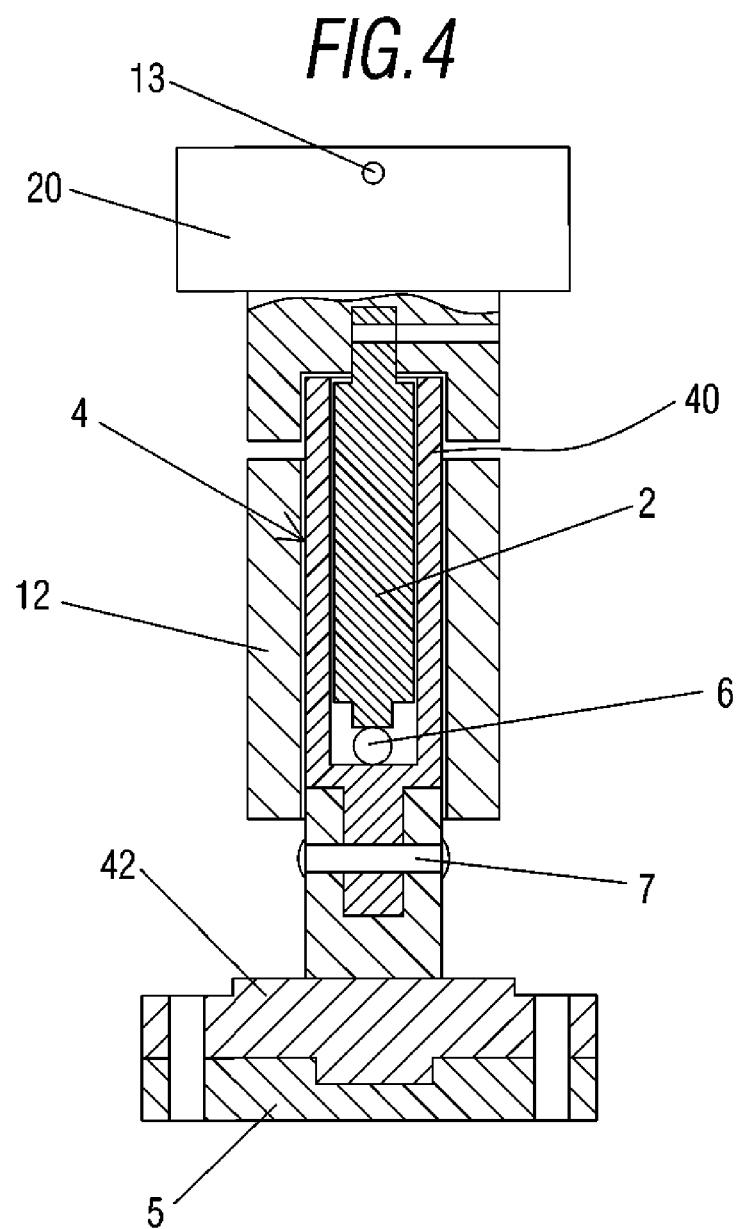

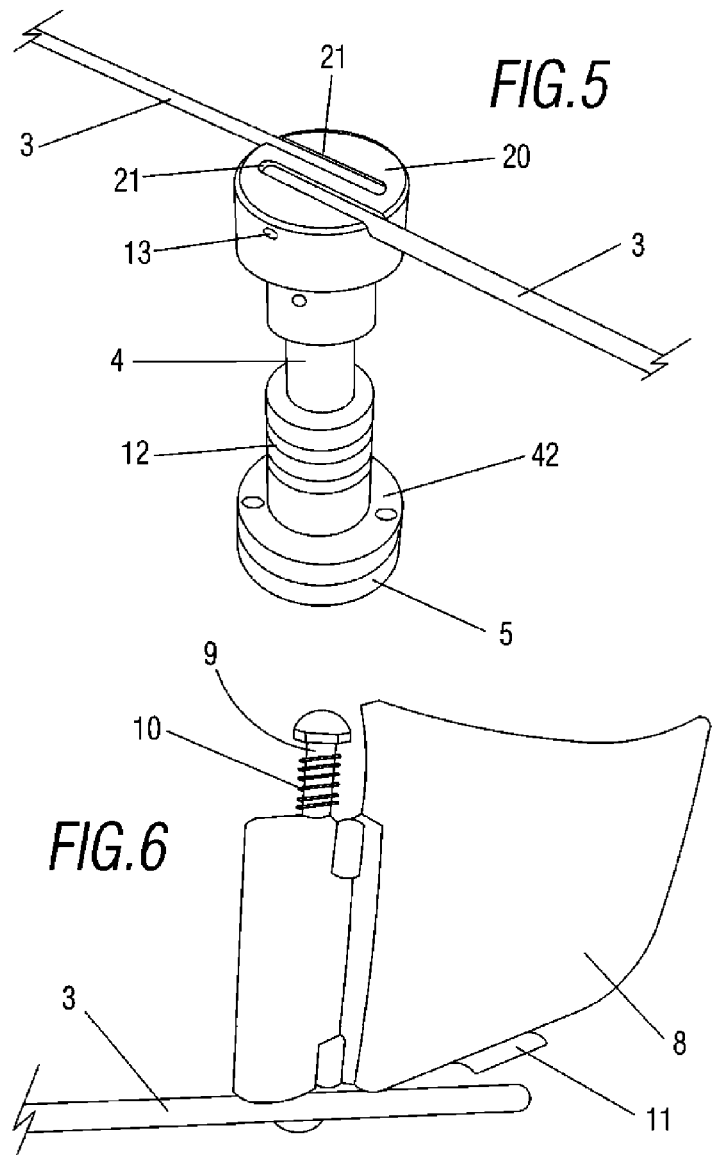

DEVICE FOR DETERRING BIRDS FROM LANDING

OBJECT OF THE INVENTION

The object of the present invention patent application is to register a device for deterring birds from landing, which includes significant innovations and advantages compared to the known state of the art.

More specifically, the invention proposes the development of a device for deterring birds from landing in a defined area, essentially being provided with a vertical shaft from which a number of rods project, which may be positioned horizontally and are able to fold when the device is not in use.

BACKGROUND OF THE INVENTION

It is well known that birds cause damage and create dirt with their droppings and feathers. In fact, the effects and damage caused by waste from marine birds such as seagulls on leisure, sport and professional maritime vessels, or even on the maritime environment or ports, is visible to the naked eye. The usual consequences of bird waste are oxidisation and premature corrosion, which lead to more cleaning and maintenance operations in order to prevent the deterioration of vessels, which in turn increases economic cost and time spent.

In order to prevent the damaging consequences caused by birds, different static and/or mobile methods and devices that seek to prevent birds from landing in a defined area have been developed. One example of a bird-repelling device is one made up of a vertical rotary shaft from which two horizontal rods project, such that air currents make the vertical shaft rotate. However, in the particular case of maritime vessels, it has been found that in strong or intense wind conditions and/or over a long period of time, the vertical shaft rotates at such a speed that it causes the same to break, this potentially being dangerous for users or causing damage to some regions of the vessel.

Furthermore, none of the bird repelling or deterring apparatus and devices known about by the applicant consider the existence of an invention provided with the features described in this specification.

DESCRIPTION OF THE INVENTION

The present invention has been developed in order to provide a device for deterring birds from landing, which constitutes a novelty within the field of application and overcomes the aforementioned drawbacks, moreover offering other additional advantages that will become clear in light of the accompanying description below.

Therefore, one object of the present invention is to provide a new device for deterring birds from landing in a defined area, and is characterised in that it comprises a vertically positionable rotary actuating shaft, whereon a retractably connected pair of rods is arranged at the top by means of a hinged joint, such that said two rods are able to extend perpendicularly in relation to the actuating shaft and opposite each other, said actuating shaft being mounted on a support provided with hinge means in the lower portion, which can angularly fold down said support in relation to a base body. Moreover, the lower portion of said actuating shaft is in contact with a spherical region arranged inside said support.

Due to these features, a device that makes it possible to deter all types of birds is obtained, without causing any type of physical damage to or stress for the birds, unlike systems provided with pointed extensions, which may be installed on maritime vessels or even in open spaces, such as farmland, the same also being able to fold and unfold in a simple, quick manner as required. As such, in the event of strong, continuous wind, there is the possibility of folding the horizontal rods or the support provided with the rods, in order to prevent the device from breaking or being damaged. This folding also facilitates storage as it takes up less space.

Advantageously, the upper portion of the actuating shaft has a widened region that includes a number of guide means on the upper face thereof, which facilitate the positioning of the rods when they are extended horizontally.

In a preferred embodiment, said guide means may comprise a pair of recesses arranged parallel to each other, upon which the two rods rest when said two rods are extended.

According to another aspect of the device of the invention, the support comprises a first section formed by an elongated, tubular and internally hollow body that includes an intermediate joint coupled to a second section, said second section being formed by a body that may be coupled to the base body.

Advantageously, the support has removable coupling means that enable the support to be removably joined to the base body. In this way, the user may remove the deterring device for maintenance (repairs or replacement of pieces) or to prevent it from being stolen when not in use.

According to another aspect of the invention, an element, for example with rotary action, which facilitates the rotation action of the actuating shaft when there is a flow or current of air, has been arranged at the end of at least one of the rods.

The rotary element preferably consists of a flag supported on a rotary shaft, said rotary element moreover having fastening means that enable the flag to be kept in a fixed position on the corresponding rod.

In a preferred embodiment, the fastening means comprise a resilient spring arranged along the length of the shaft of the flag that enables the flag to move axially, and retaining elements arranged on the flag, which may be coupled to the rod in order to ensure it is fastened as required. The axial movement of the flag enables the retaining elements to be freed or fixed on the rod.

Additionally, the device may include a mobile retainer that may move along the length of the support, which may have a tubular body with the outer wall provided with a series of perimeter grooves that prevent the user's hand from slipping whilst handling it. The presence of this mobile retainer hides the area with the hinge means present in the lower portion of the support and ensures that the support does not fold in an undesired manner, for example, in the event of a gust of strong wind, which might otherwise damage the deterring device.

The aforementioned spherical region preferably consists of a spherical body, such that the rotary movement of the actuating shaft is facilitated, as there is a minimum friction coefficient between the two portions (i.e. the spherical body and the lower face of the actuating shaft).

Alternatively, the rotary actuating shaft may have a geared motor connected electrically through at least one photovoltaic panel. This aspect is appropriate when the device is installed on farmland where there is not always wind to produce the rotary movement of the vertical actuating shaft.

Other characteristics and advantages of the device for deterring birds from landing, object of the present invention, will become clear in light of the description of a preferred, though non-exclusive, embodiment, which, by way of a non-limiting example, is illustrated in the accompanying drawings, wherein:

BRIEF DESCRIPTION OF THE DRAWINGS

FIG. 4.—Is a partial transverse cross-section view of the deterring device of the invention;

FIG. 5.—Is a detailed perspective view of the central portion of the deterring device of the invention; and FIG. 6.—Is a detailed perspective view of one embodiment of the rotating element situated at the end of each one of the rods.

DESCRIPTION OF A PREFERRED EMBODIMENT

In light of the aforementioned figures and, in accordance with the adopted numbering, one may observe therein a preferred embodiment of the invention, which comprises the portions and elements indicated and described in detail below.

Figure 1:
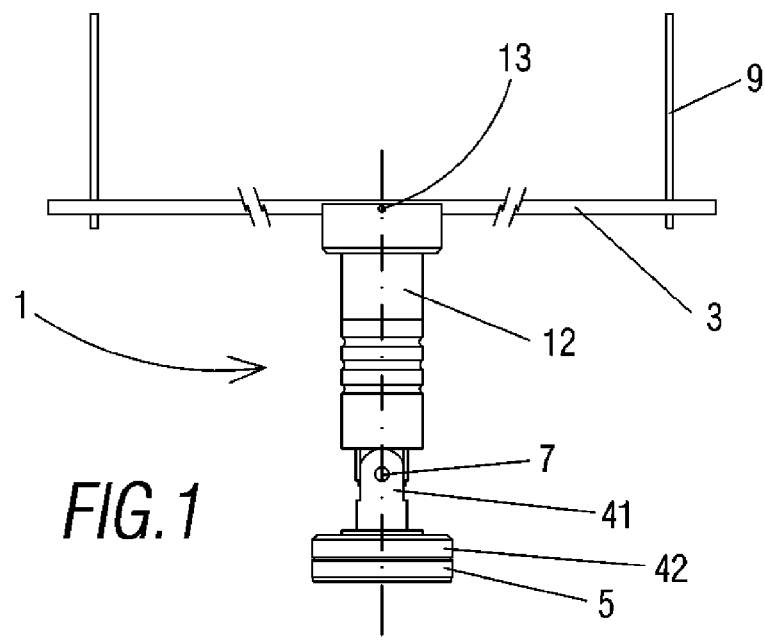
FIG. 1.—Is a side elevation view of the device for deterring birds from landing in an unfolded state, in which some portions have been omitted for the purpose of clarity.
Figure 2:
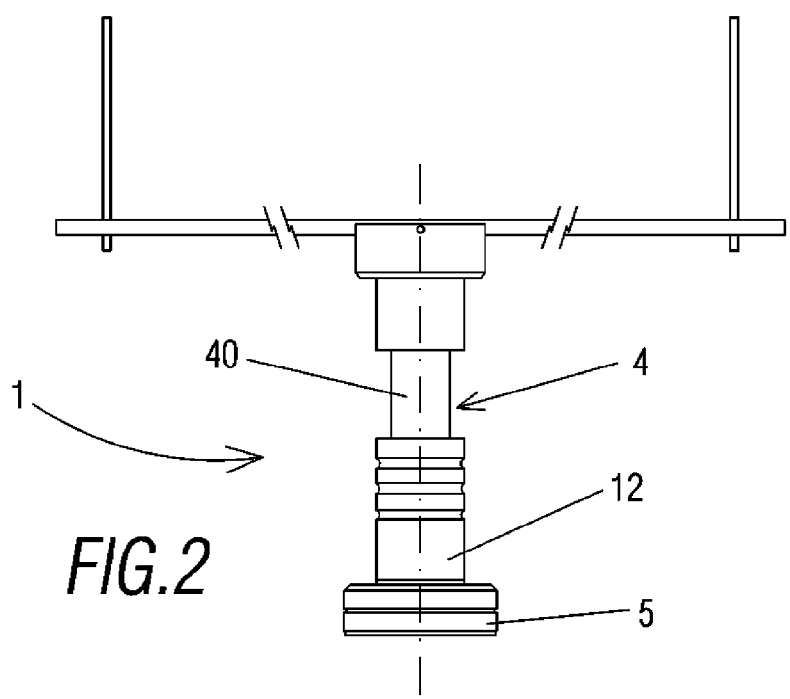
FIG. 2.—Is a side elevation view of the deterring device represented in the figure above with the mobile retainer moved downwards, i.e., hiding the hinge area present on the support.

Thus, as may be seen in the drawings, the device for deterring birds from landing in a defined area, which is generally indicated with the reference (1), comprises a vertically positionable rotary actuating shaft (2) (in a mounting position on a surface) whereon a retractably connected pair of elongated rods (3) is arranged at the top by means of a hinged joint essentially formed by a pin (13), which transversally passes through the upper portion of the actuating shaft (2). In this way, said two rods (3) are susceptible to being extended perpendicularly with respect to the actuating shaft (2) and opposite each other, as shown in FIGS. 1 and 2, when in use and folded when not in use.

Said actuating shaft (2) is housed inside a support (4) made of any appropriate material (metal or plastic material that includes an anti-UV treatment) provided in the lower portion of the hinge means (which will be described in more detail below), which can angularly and manually fold down said support (4) with respect to a base body (5) fixed to a surface of a vessel, for example.

In order to facilitate the rotation action of the actuating shaft (2) in either of the two directions of rotation, the lower portion of said actuating shaft (2) is in contact with a stainless steel spherical body (6) situated inside the support (4), as seen more clearly in FIG. 4.

The upper portion of the actuating shaft (2) has a widened region (20) that includes a number of guide means on the upper face thereof to appropriately position the rods (3) when they are in a horizontal and extended position. More specifically, these guide means comprise a pair of elongated recesses (21) with a concave cross-section arranged parallel to each other, upon which the two rods (3) rest, as may be seen in more detail in FIG. 5.

It must be noted that the widened region (20) may be a prolongation or an additional piece fixed to the elongated body that constitutes the actuating shaft (2).

Figure 3:
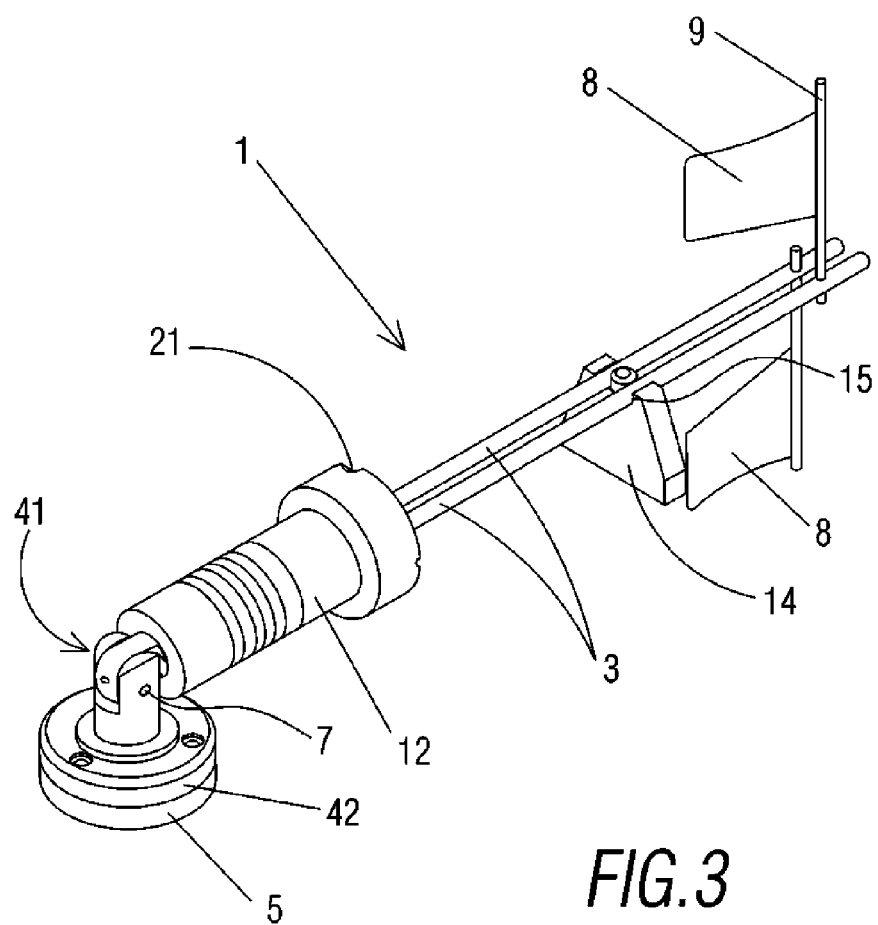
FIG. 3.—Is a perspective view of the deterring device represented in the figure above in a folded state.

As may be seen in FIGS. 1 and 3, the support (4) comprises an upper first section (40) formed by an elongated, tubular and internally hollow body that includes a joint (41) provided with a pin (7) coupled to a lower second section (42). As may be seen, the second section (42) is formed by a discoid body coupled to the base body (5) and a fork-shaped upper extension where the pin (7) is fixed.

Advantageously, the support (4) has removable coupling means in order to be removably joined to the base body (5), thus meaning it may be quickly disassembled. Such means may be, for example, screw elements or a conventional tongue and groove system, for which reason it shall not be described in more detail.

As may be seen in FIG. 6, a rotary element has been arranged at the end of at least one of the rods (3), which consists of a flag (8) made up of a thin metal plate supported on a rotary shaft (9) that runs through a through hole of the flag (8) and is arranged perpendicularly to the rod (3). The flag (8) further comprises fastening means to keep it in a fixed position on the rod (3).

With reference to the aforementioned fastening means, these comprise a resilient spring (10) arranged along the length of the shaft (9) of the flag (8), as well as a curved or arched tab (11), projecting from the lower portion of the flag (8), which acts as a retaining element. In this way, the flag (8) may be removably coupled to the rod (3).

Additionally, a mobile retainer (12) is provided that constitutes a tubular body made out of a malleable, rigid plastic material, for example, with the outer wall provided with a series of perimeter grooves, such that it may be manually moved longitudinally along the length of the outer face of the support (4) by simply sliding it.

Additionally, it may be provided with a geared motor (not shown) linked to the rotary actuating shaft (2), which is connected electrically through at least one photovoltaic panel (not shown), which may be of use in regions where air currents are not continuous.

Lastly, the device (1) described herein may include a resting accessory (14) (see FIG. 3) at a distance from the base (5) where the two rods (3) may rest when they are folded, i.e. when the device is not in use. The resting accessory (14) has two slots (15) that are separated and parallel to each other in the upper portion thereof where the rods (3) rest.

The details, shapes, dimensions and other accessory elements, as well as the materials used to manufacture the device of the invention, may be suitably substituted for others which are technically equivalent, and do not diverge from the essential nature of the invention, nor the scope defined by the claims included below.

The invention claimed is:

1. A device for deterring birds from landing in a defined area, comprising a vertically positionable rotary actuating shaft whereon a retractably connected pair of rods is arranged at the top by a hinged joint, such that said two rods are able to extend horizontally and perpendicularly in relation to the actuating shaft and opposite each other, said actuating shaft being mounted on a support provided with a hinge in the lower portion thereof that can angularly fold down said support in relation to a base body, and in which the lower portion of said actuating shaft is in contact with a spherical region situated inside said support.

2. The device for deterring birds from landing according to claim 1, wherein the upper portion of the actuating shaft has a widened region that includes a guide in the upper face thereof in order to position the rods horizontally.

3. The device for deterring birds from landing according to claim 2, wherein the guide comprises a pair of recesses arranged parallel to each other, upon which the two rods rest when said two rods are extended.

4. The device for deterring birds from landing according to claim 1, wherein the support comprises a first section formed by an elongated, tubular and internally hollow body that includes a joint that couples to a second section formed by a body that may be coupled to said base body.

5. The device for deterring birds from landing according to claim 1, wherein the support has a removable coupling in order to be removably joined to the base body.

6. The device for deterring birds from landing according to claim 1, wherein an element has been arranged at the end of at least one of the rods.

7. The device for deterring birds from landing according to claim 6, wherein the element is a rotary element.

8. The device for deterring birds from landing according to claim 7, wherein the rotary element comprises a flag supported on a rotary shaft.

9. The device for deterring birds from landing according to claim 8, wherein the rotary element comprises a fastener to keep the flag in a fixed position on the rod.

10. The device for deterring birds from landing according to claim 9, wherein the fastener comprises a resilient spring arranged along the length of the rotary shaft of the flag and at least one retaining element arranged on the flag that may be coupled to the rod.

11. The device for deterring birds from landing according to claim 1, including a mobile retainer that may move along the length of the support.

12. The device for deterring birds from landing according to claim 11, wherein the mobile retainer has a tubular body with an outer wall being provided with perimeter grooves.

13. The device for deterring birds from landing according to claim 1, wherein the spherical region that is in contact with the lower portion of the actuating shaft comprises a spherical body.

14. The device for deterring birds from landing according to claim 1, wherein the hinged joint of the rods with respect to the support comprises a pin that transversally passes through the actuating shaft.

15. The device for deterring birds from landing according to claim 4, wherein the hinge is provided with a pin that is coupled to a fork-shaped upper extension present on the second section.

* * * * *